United States Patent [19]

Chow et al.

[11] Patent Number: 5,617,486
[45] Date of Patent: Apr. 1, 1997

[54] CONTINUOUS REFERENCE ADAPTATION IN A PATTERN RECOGNITION SYSTEM

[75] Inventors: Yen-Lu Chow, Saratoga; Peter V. deSouza, San Jose; Adam B. Fineberg; Hsiao-Wuen Hon, both of Saratoga, all of Calif.

[73] Assignee: Apple Computer, Inc., Cupertino, Calif.

[21] Appl. No.: 563,256

[22] Filed: Nov. 27, 1995

Related U.S. Application Data

[63] Continuation of Ser. No. 129,679, Sep. 30, 1993, abandoned.
[51] Int. Cl.$^6$ .................................................. G06K 9/00
[52] U.S. Cl. .................... 382/181; 382/159; 382/225; 395/2.53; 395/2.65
[58] Field of Search .................................. 382/115, 119, 382/159, 160, 161, 181, 187, 215, 225, 228; 395/2, 2.53, 2.54, 2.59, 2.64, 2.65; 381/41, 42, 43

[56] References Cited

U.S. PATENT DOCUMENTS

| | | | |
|---|---|---|---|
| 4,495,644 | 1/1985 | Parks et al. | 382/123 |
| 4,724,542 | 2/1988 | Williford | 382/119 |
| 5,050,215 | 9/1991 | Nishimura | 381/41 |
| 5,127,055 | 6/1992 | Larkey | 381/43 |
| 5,222,146 | 6/1993 | Bahl et al. | 381/43 |

FOREIGN PATENT DOCUMENTS 0559349  9/1993  European Pat. Off. .

OTHER PUBLICATIONS

T.H. Applebaum et al., "Enchancing the Discrimination of Speaker Independent Hidden Markov Models with Corrective Training", ICASSP' 89, 23 May 1989, GLASGOW pp. 302–305.

N.J. Anthony et al. "Supervised Adapatation for Signature Verification System, " IBM Technical Disclosure Bulletin, vol. 21, No. 1, Jun. 1978, pp. 424–425.

Pao–Chung Chang et al., "Discrimative Training of Dynamic Programming Based Speech Recognizers", No. 2, Apr. 1993, New York, pp. 135–143.

*Primary Examiner*—Leo Boudreau
*Assistant Examiner*—Phuoc Tran
*Attorney, Agent, or Firm*—Blakely, Sokoloff, Taylor & Zafman

[57] ABSTRACT

A pattern recognition system which continuously adapts reference patterns to more effectively recognize input data from a given source. The input data is converted to a set or series of observed vectors and is compared to a set of Markov Models. The closest matching Model is determined and is recognized as being the input data. Reference vectors which are associated with the selected Model are compared to the observed vectors and updated ("adapted") to better represent or match the observed vectors. This updating method retains the value of these observed vectors in a set of accumulation vectors in order to base future adaptations on a broader data set. When updating, the system also may factor in the values corresponding to neighboring reference vectors that are acoustically similar if the data set from the single reference vector is insufficient for an accurate calculation. Every reference vector is updated after every input; thus reference vectors neighboring an updated reference vector may also be updated. The updated reference vectors are then stored by the computer system for use in recognizing subsequent inputs.

41 Claims, 11 Drawing Sheets

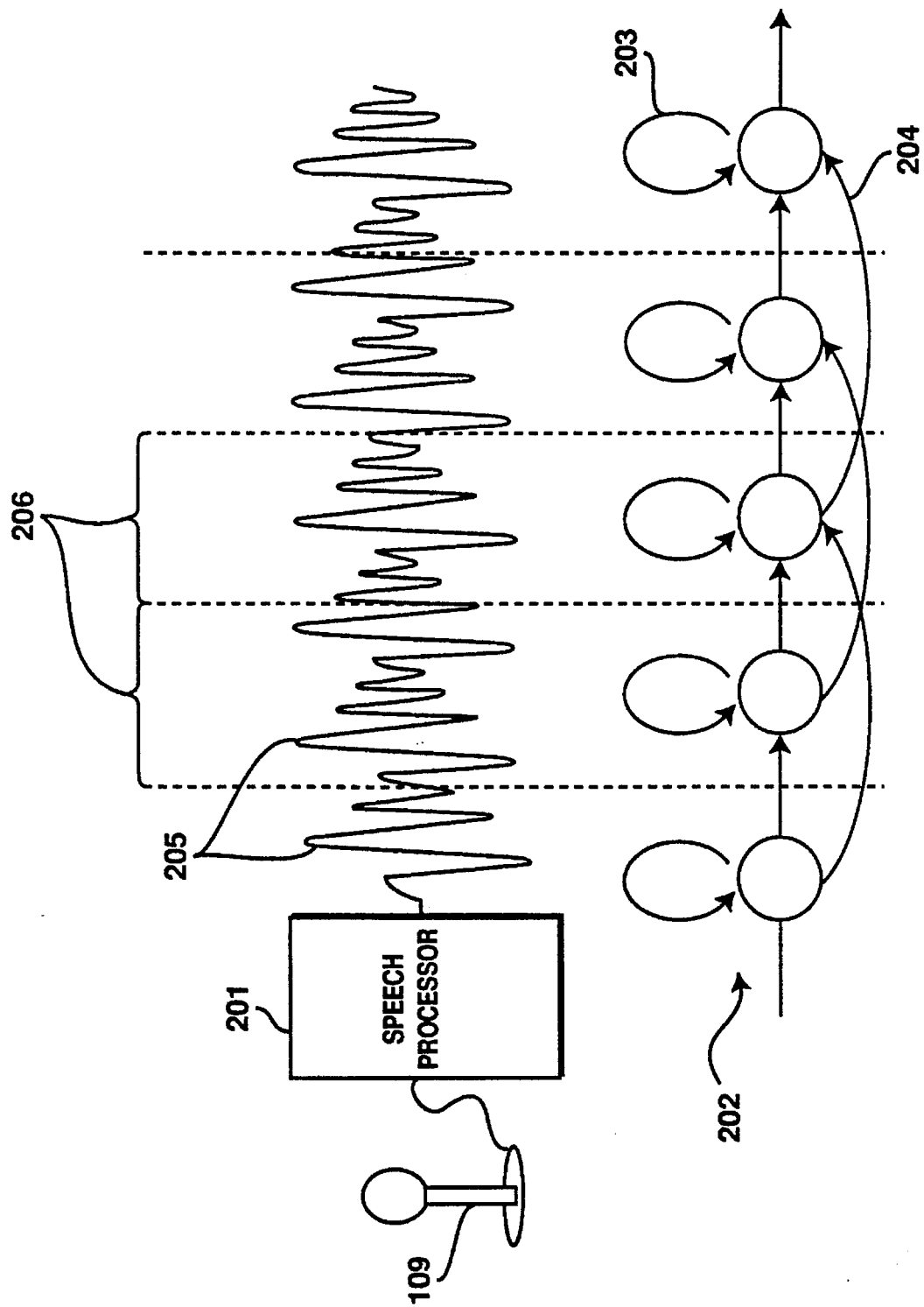

CONTINUOUS REFERENCE ADAPTATION IN A PATTERN RECOGNITION SYSTEM

This is a continuation of application No. 08/129,679, filed Sep. 30, 1993, now abandoned.

BACKGROUND OF THE INVENTION

(1) Field of the Invention

The present invention relates to pattern recognition systems in general. Specifically, the present invention relates to continuously adapting a pattern recognition system to better resemble an input source.

(2) Prior Art

Many speech recognition systems utilizing known speech references are currently known in the art. In many of these systems no adaptation of the system to an input voice takes place of any kind. That is, many systems contain a set of known references to which the input speech is compared, however these systems do not employ any means for adapting these known references to the individual speaker or the speaker's acoustic environment. Other systems do not employ the concept of a correct reference being associated with the input speech and therefore adaptation of a known speech reference to an individual speaker is not possible.

Some speech recognition systems do provide a limited amount of adaptation of the system to the individual. This limited adaptation usually consists of a step requiring the speaker to read several test sentences into the system thereby allowing, the system to compute a transformation between the speaker's data (i.e., voice characteristics) and the reference data (i.e., reference voice characteristics). Such limited adaptation, however, has several drawbacks. First, it requires each new speaker to the system to read the test sentences before using the system. This reduces the speed of the system and increases the hassle to the individuals. Second, it does not allow for any adaptation after the initial transformation is computed. This shortcoming significantly reduces the effectiveness of the system because the system cannot adapt to changing conditions. For example, after a continuous period of speech, a speaker may become tired. The speaker's tone and speed would change along with his or her mood change, thereby making the original transformation less and less effective.

The present invention solves these and other problems. The present invention requires no reading of test sentences to create a transformation. The present invention system is ready to receive input from a new speaker as soon as the speaker is ready to commence speaking. The present invention also continuously adapts to its acoustic environment. That is, it continuously adapts to changing moods of the speaker or any other changes in the speaker's voice. Furthermore, the present invention adapts to changing background noise and is therefore able to better understand the speaker when background noise increases while the system is being used.

Accordingly, it is an object of the present invention to provide an efficient speech recognition system that adapts to its acoustic environment. It is further an object of the present invention to provide such a speech recognition system operable in a general purpose desktop computer system. It is yet another object of the present invention to provide a speech or pattern recognition system that requires no test input before becoming trained to a particular input voice but rather adapts as the unknown voice is presented. These and other objects not specifically mentioned above will become clear upon discussions of the present invention to follow.

SUMMARY OF THE INVENTION

The present invention comprises a method and apparatus for continuously updating a speech recognition system to adapt to a speaker's voice and changing background noise. The present invention directs a computer system to take as input a string of utterances from the speaker and converts the speech signals to a digital signal form using an A/D converter. The system then slices the utterance in the time dimension and creates a set of observed speech vectors with each vector representing one slice of time.

The system of the present invention contains a set of reference vectors and a set of Markov Models stored in a memory unit. After creating the set of observed speech vectors, the system of the present invention compares the observed vectors to the reference vectors and, utilizing the well known Viterbi procedure, determines the Markov Model in memory closest to the input utterance. The present invention recognizes the utterance as this Markov Model and proceeds to adapt the reference vectors corresponding to this Markov Model to the observed vectors for the utterance.

To adapt the reference vectors to the observed vectors of the input utterance, the present invention creates an accumulation vector and a count for every reference vector in the system, initializing each to zero at first. The reference vector associated with each Markov Model arc, as identified by the Viterbi procedure is then accessed by the present invention. If multiple reference vectors are associated with a given arc, then the present invention selects the reference vector closest to the observed vector. The present invention then references the accumulation vector and count corresponding to the selected reference vector from the Markov Model arc and follows one of two steps. If the count is less than a predetermined constant, then the count is incremented by one and the observed vector is added to the accumulation vector. If the count is greater than or equal to the predetermined constant, then the count remains the same and the observed vector is added to the accumulation vector such that the previous values in the accumulation vector are downweighted. This allows the present invention to continuously replace older reference data with newer data for those references that matched the input utterance.

After following the above process for each observed vector in the utterance, the present invention calculates a correction vector for every reference vector in the system, including those that did not match with the input utterance. The correction vector is a function of the accumulation vector for a given reference vector and the reference vector itself, and possibly the accumulation and reference vectors of nearby references. The present invention will rely solely on that particular reference vector only if a minimum number of observed vectors have been added to its accumulation vector during the processing of previous input utterances. If this minimum number is not satisfied for a particular reference vector, then the present invention will factor in the accumulation vectors and reference vectors for the closest reference vectors to that particular reference vector. The number of additional reference and accumulation vectors to consider depends on a predefined constant. If the count corresponding to a particular reference vector is less than this constant, then the present invention will consider additional reference and accumulation vectors until either the sum of their corresponding counts equals or exceeds this constant or no additional reference vectors exist which are close enough to that particular reference vector.

The present invention directs the computer system to store these updated reference vectors and uses them in place of the original reference vectors in recognizing the next utterance input to the system. However, the present invention saves the original reference vectors which are used, in part, to compute a new correction vector. The present invention continuously repeats the above process for each input utterance, with new updated reference vectors being created which replace the preceding set of updated reference vectors. It is appreciated that the present invention, in performing the above procedures, acts to update not only those reference vectors that match the observed vectors but also acts to update acoustically similar references during the initial training or adaptation period.

The present invention additionally includes a general purpose desktop computer system operable to perform the above procedures.

BRIEF DESCRIPTION OF THE DRAWINGS

FIG. 2B is a diagram showing the association of the observed vectors of an unknown utterance to the arcs of a matched Markov Model used by the present invention.

DETAILED DESCRIPTION OF THE INVENTION

Figure 1A:
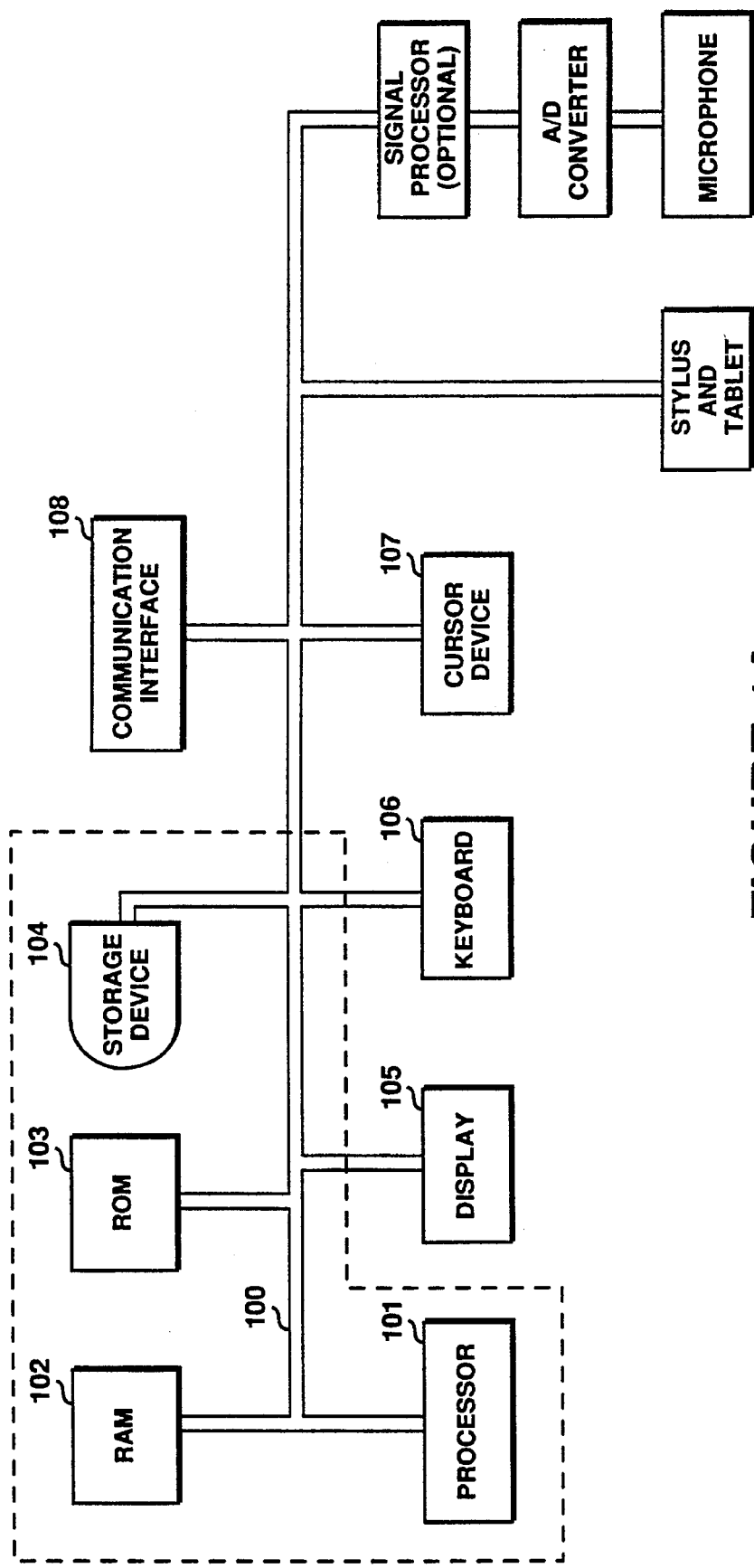
FIG. 1A is a block diagram of a computer system used by the preferred embodiment of the present invention.

In the following detailed description of the present invention numerous specific details are set forth in order to provide a thorough understanding of the present invention. However, it will be obvious to one skilled in the art that the present invention may be practiced without these specific details. In other instances, well known methods, procedures, components, and circuits have not been described in detail as not to unnecessarily obscure aspects of the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. The algorithms and displays presented herein are not inherently related to any particular computer or other apparatus. Various general purpose machines may be used with programs in accordance with the teachings herein, or it may prove convenient to construct more specialized apparatus to perform the required method steps. The required structure for a variety of these machines will appear from the description below. In addition, the present invention is not described with reference to any particular programming language. It will be appreciated that a variety of programming languages may be used to implement the teachings of the invention as described herein.

One embodiment of the preferred embodiment of the present invention is a speech recognition system. However, it should be realized that the present invention is not limited to such systems and applies equally to other pattern recognition systems, such as handwriting recognition systems in which reference and observed vectors would relate to handwriting patterns and data as input from a stylus and tablet, for example.

The present invention includes an apparatus and method for continuously updating a pattern recognition system to adapt to a speaker's voice and changing background noise. In general, computer systems used by the preferred embodiment of the present invention, as illustrated in block diagram format in FIG. 1A, comprise a bus 100 for communicating information, a central processor 101 coupled with the bus for processing information and instructions, a random access memory 102 coupled with the bus 100 for storing information and instructions for the central processor 101, a read only memory 103 coupled with the bus 100 for storing static information and instructions for the processor 101, a data storage device 104 such as a magnetic disk and disk drive coupled with the bus 100 for storing information (such as audio or voice data) and instructions, a display device 105 coupled to the bus 100 for displaying information to the computer user, an alphanumeric input device 106 including alphanumeric and function keys coupled to the bus 100 for communicating information and command selections to the central processor 101, a cursor control device 107 coupled to the bus for communicating user input information and command selections to the central processor 101, a signal generating device (communication interface) 108 coupled to the bus 100 for communicating command selections to the processor 101, a standard microphone 109 to input audio or voice data to be processed and stored by the computer system, an analog to digital converter 110 coupled to the microphone 109 and the bus 100 to transform analog voice data from the microphone 109 to digital form which can be processed by the computer system, and a stylus and tablet 112 coupled to the bus 100 for communicating digital information representative of handwriting to the processor 101.

The present invention may also optionally include a signal processor 111 coupled to the analog to digital converter 110 and the bus 100 for preliminary processing of the voice data before it is communicated to the processor 101 and the rest of the system over bus 100. The signal generation device 108 also includes, as an output, a standard speaker for realizing the output audio from input signals from the computer system. Block 108 also includes well known audio processing hardware to transform digital audio data to audio signals for output to the speaker, thus creating an audible output.

The display device 105 of FIG. 1A utilized with the computer system and the present invention may be a liquid crystal device, cathode ray tube, or other display device suitable for creating graphic images and alphanumeric characters recognizable to the user. The cursor control device 107 allows the computer user to dynamically signal the two dimensional movement of a visible symbol (pointer) on a display screen of the display device 105. Many implementations of the cursor control device are known in the art including a trackball, mouse, joystick or special keys on the alphanumeric input device 106 capable of signaling movement of a given direction or manner of displacement. It is to be appreciated that the cursor means 107 also may be directed and/or activated via input from the keyboard using special keys and key sequence commands. Alternatively, the cursor may be directed and/or activated via input from a number of specially adapted cursor directing devices, including those uniquely developed for the disabled. The input cursor directing device or push button may consist of any of those described above and specifically is not limited to the mouse cursor device.

Figure 1B:
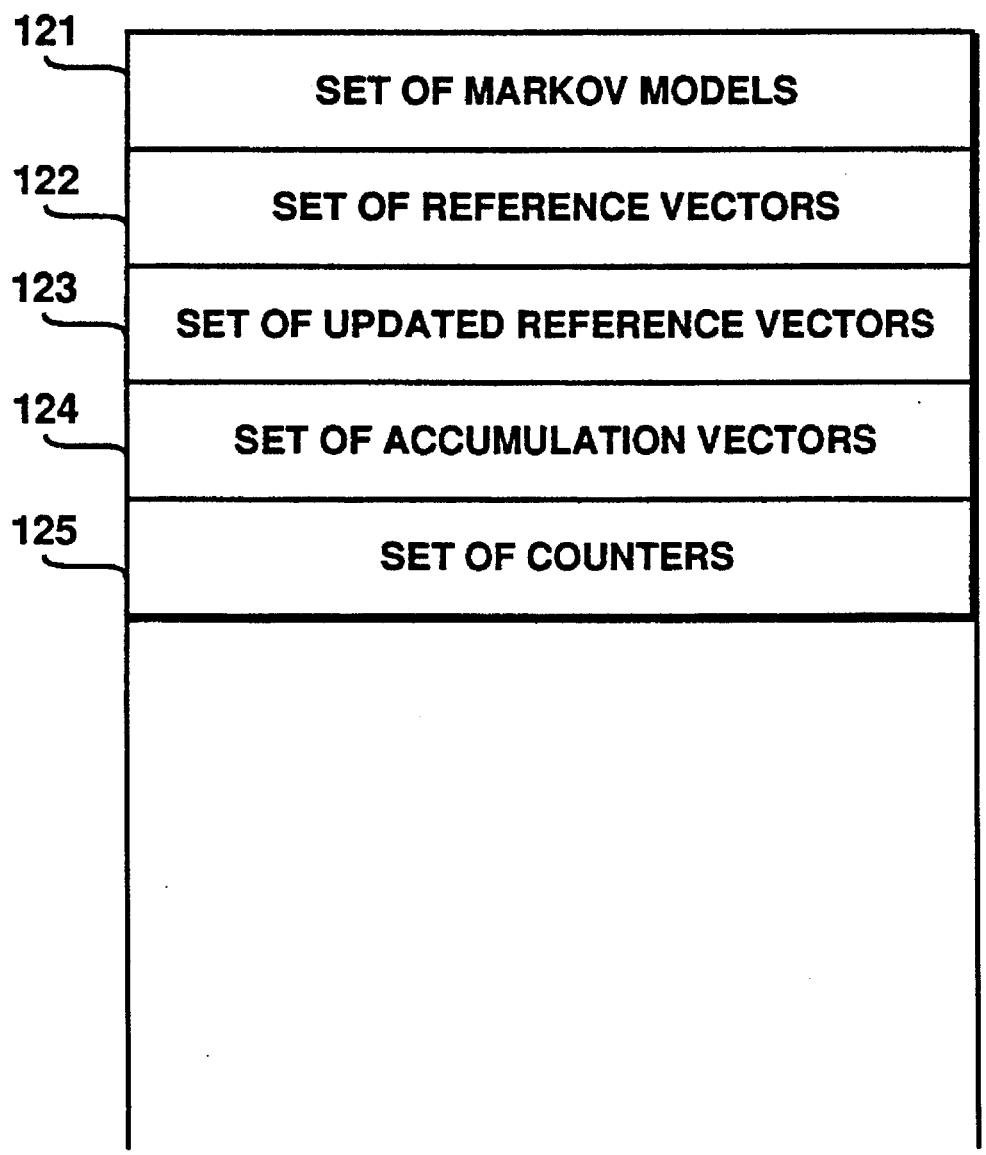
FIG. 1B is a block diagram of the random access memory of FIG. 1A.

FIG. 1B shows an example data structure arrangement of memory unit, random access memory 102 of FIG. 1A. Memory 102 shows the storage of a set or array of Markov Models 121, a set or array of reference vectors 122, a set or array of updated reference vectors 123, a set or array of accumulation vectors 124, and a set or array of counters 125 in blocks. Note that FIG. 1B is exemplary and the illustrated order of the above data arrays is not intended to limit the scope of the present invention. For example, the set of updated reference vectors could alternatively be stored in a storage device 104, or the set of Markov Models could alternatively be stored in a storage device 104 or a read only memory 103.

The storage of sets or arrays in memory 102 as shown in FIG. 1B is well known in the art. Each set or array is stored in a block of memory as shown. Note that the ordering of these blocks is exemplary and is not intended to limit the scope of to be present invention. For example, the set or array of Markov Models 121 may be positioned physically in memory 102 before or after the set or array of reference vectors 122. The computer system will determine which block of memory 102 each set or array should be stored in. Note also that the size of the blocks may not be identical; the computer system will determine the size of the block necessary to store each set or array.

Figure 2A:
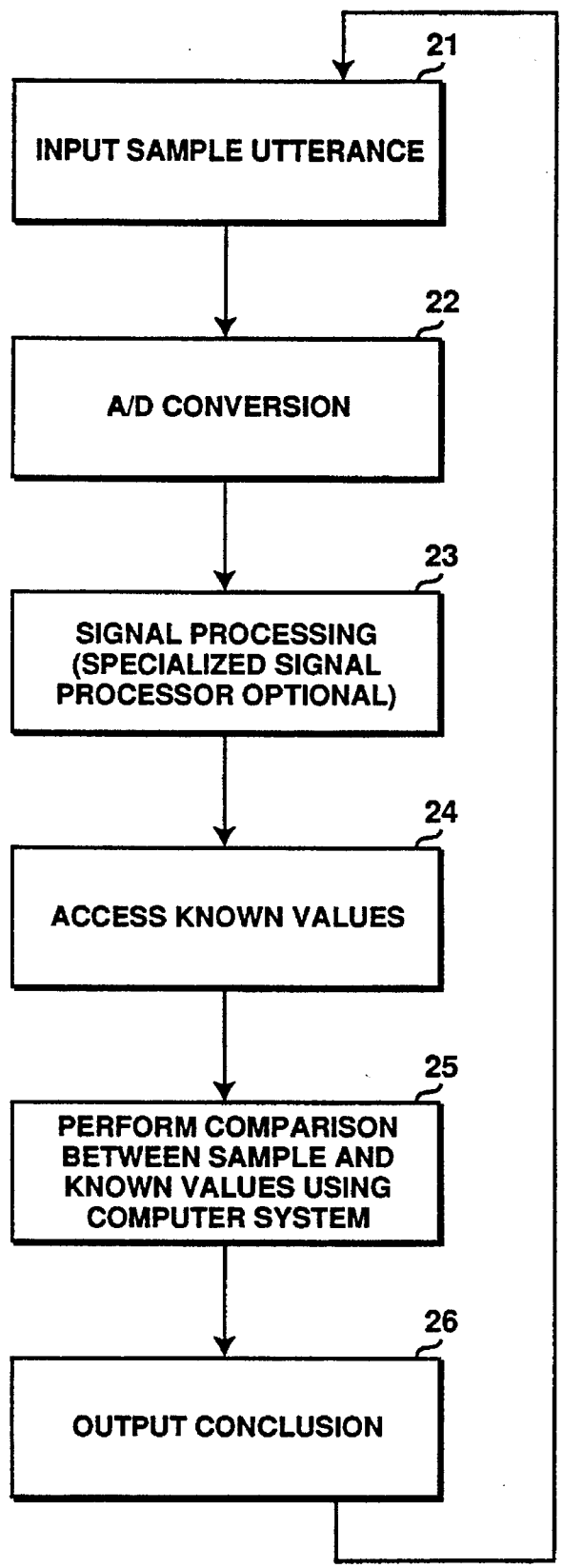
FIG. 2A is a flowchart of the general method of the present invention as processed by a computer system.

FIG. 2A shows a flowchart of the general method used by a computer system of the present invention. Input utterance data is introduced to the computer system at step 21. The form of this input may vary, for example, the input may be voice data from a live speaker or a recorded voice. Upon receiving input, for example an utterance from an individual, the system transforms the analog voice data signals to digital form at step 22, which can be processed by the computer system of the present invention.

In step 23, the utterance (in digital form) is processed. A specialized signal processor is optional; for example, if the computer system contains a signal processor 111 it may be employed to process the utterance, thereby alleviating the central processor 101 of the task. In systems where no signal processor exists, or one exists but is not utilized, the central processor 101 must perform the task. Regardless of which processor performs the task, the utterance (in digital form) is processed by being sliced in equal increments along the time dimension. Typically, the utterance is signal divided into 100 slices per second, thereby creating 100 slices of equal duration. However, the duration of a single slice may vary from system to system and the duration given above is exemplary and not intended to limit the scope of the present invention. Each slice is then converted into a vector, referred to as an observed vector, the creation of which is well known in the art. An observed vector, in one form, represents a summary of the utterance data for a given time slice. For instance, such a vector may consist of signal intensity or numerical energy data over a given set of frequency ranges. However, the types of observed vectors known to the art and their formats are great and any number will operate effectively within the scope and spirit of the present invention.

In step 24, the present invention directs the computer system to access known values which are stored in a memory unit 102 or other storage device of the system. These known values consist of a set of Markov Models (Models) and reference vectors, such as Gaussian means, both of which are well known in the art. One or more of the reference vectors is associated with each arc of each Markov Model.

At step 25 the present invention directs the computer system to compare the utterance, represented by the set of observed vectors, to the set of Markov Models. This comparison is done in part using any of a variety of procedures well known in the art, such as the Viterbi procedure, which determines the best path of an unknown utterance through the given set of Markov Models. The Viterbi procedure also associates the unknown vectors of the unknown utterance to particular arcs of the Markov Models. This information will be read by the present invention to associate a given observed vector to a set of reference vectors. The Viterbi procedure as implemented within the present invention utilizes reference vectors that are adapted, according to the present invention, to the unknown utterance. Prior art speech recognition systems do not perform such adaptation.

The adaptation process of the present invention as mentioned above occurs at step 25 also. The present invention updates the set of reference vectors corresponding to the identified Markov Model to more closely resemble the observed vectors. This adaptation process is explained in detail below.

The present invention utilizes the updated reference vectors when processing subsequent input utterances. That is, when the present invention is comparing a subsequent unknown utterance to the set of Markov Models, the reference vectors corresponding to the Markov Models used by the comparison procedure, such as the Viterbi procedure, will be the updated reference vectors. Thus, the present invention will be able to better match subsequent utterances to the Markov Models.

The result of the comparison is output at step 26. This output is the single Model that is the closest match to the set of observed vectors. It should be noted that no guarantee exists that the resultant Model is the correct interpretation of the utterance. The resultant Model is the one Model in the set of Models with the highest probability of accuracy; however, the interpretation will be correct the overwhelming majority of the time.

The output step 26 encompasses a broad range of possibilities. For example, the system may output the data in visual form over the display device 105, in audio form over the speaker included in signal generation device 108, or storage format in storage device 104 or random access memory 102. Another potential output is the execution of a command, for example running an application program, opening or closing a particular data file, performing a maneuver in a running application such as a game, or shutting off the computer.

FIG. 2B shows the association of the observed vectors of the unknown utterance to the arcs of the matched Markov Model output at step 26, as provided by the Viterbi procedure discussed above. The unknown utterance is input to the present invention using the microphone 109 of FIG. 1A. The speech processor 201 transforms the input utterance to a set of observed vectors 205, with each observed vector 205 corresponding to individual time slices 206. The speech processor 201 may be the central processor 101 or the signal processor 111 of FIG. 1A. The matched Markov Model 202 is shown with arcs 203 and 204 matched to the observed vectors 205 of the unknown utterance. It will be seen that arcs 203 and 204 are aligned with observed vectors 205 according to time slices 206.

It is appreciated that the present invention adaptation process may effectively operate using a variety of Markov Model procedures. For instance, the present invention may operate using a Markov Model procedure that allows arc transitions between arcs that are not adjacent, as shown in FIG. 2B. However, the present invention may also operate using Markov Models that allow only arc transitions between adjacent arcs.

After outputting, the results of the comparison at step 26, the present invention returns to step 21 and awaits further input.

Figure 3:
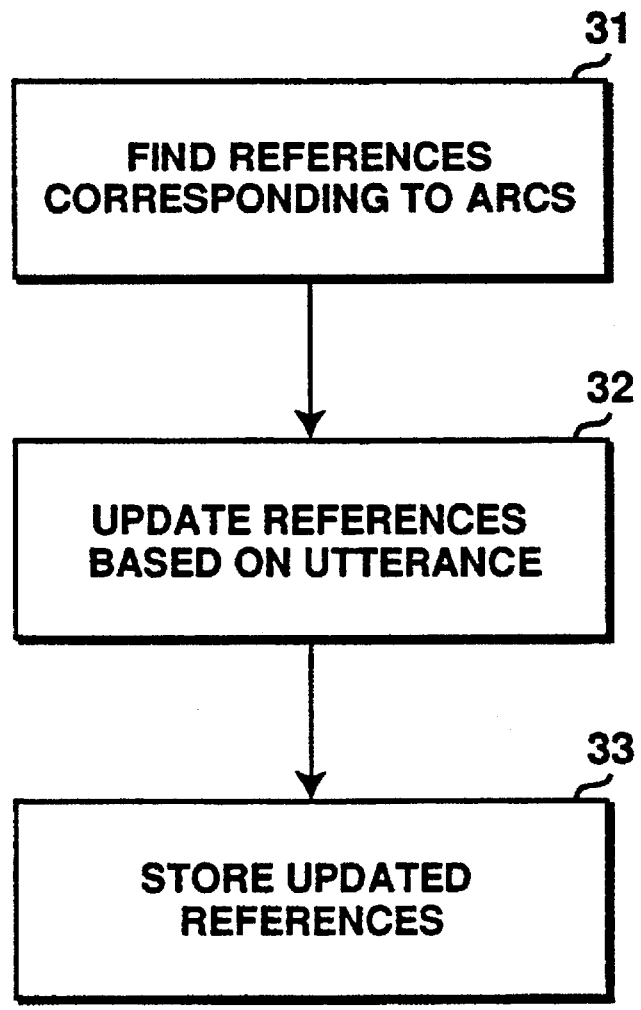
FIG. 3 is a flowchart of the comparison step of FIG. 2A generally.

FIG. 3 shows a flowchart of the comparison step 25 of FIG. 2A generally. At step 31, the present invention accesses the reference vectors in its storage or memory which are associated with the arcs of the resultant Model. These reference vectors are of the same dimension as the observed vectors, i.e., they will have the same number of elements.

Once the associated reference vectors are accessed, the present invention directs the computer system to update all the reference vectors in the system based on the utterance, as shown in step 32. The present invention assumes that the resultant Model above is the correct interpretation of the utterance. The Viterbi procedure, which determined the resultant Model above, will also return additional information, namely the path through the resultant Model. This path details which arcs of the resultant Model correspond to which observed vectors in their time alignment. Given this path and the associations between the Markov arcs and the reference vectors, the reference vectors and the observed vectors are aligned.

The present invention uses this alignment to update the reference vectors stored in the computer system to more closely resemble the utterance. This updating is based on the theory that inputs to the system change over time; the speaker may change, background noise may change, etc. Despite having thousands of reference vectors to which the utterance can be compared, prior art systems cannot accurately represent the actual voice of every person under every circumstance without the ability to adapt. Accordingly, the adaptation system of the present invention helps overcome this problem.

When a reference vector is updated, it is adjusted slightly by the present invention to be closer in value to the observed vector it is aligned with. This adjustment is described below in detail. In essence, the present invention assumes that the speaker's voice is better represented by combining the present utterance and the stored reference vectors than by relying on the reference vectors alone. The present invention therefore adjusts the reference vectors to be closer to the input utterance, i.e., the observed vectors. Note that the system does not replace the reference vectors with the observed vectors; it merely moves the reference vectors closer to the observed vectors. This is done so that an atypically pronounced word or an incorrectly interpreted word does not significantly degrade the efficiency of the system. The adaptations will gradually adapt the system to the particular characteristics of the speaker's voice and background noise over time. Since the present invention does not replace the original reference vectors, it may still recognize unfamiliar voices, if and when requested.

Note also that no guarantee exists that the reference vectors being updated after a particular utterance are moved closer to the proper observed vectors. The performance of the present invention is dependent on the accuracy of the matching procedure. Therefore, an incorrect match would result in updating the reference vectors associated with the interpreted word to be closer to the utterance, even though the interpreted word and the utterance are not the same. This may result in some reference vectors being updated so that they less closely resemble the speaker's voice, however such degradation has minimal impact on the system and over time the updating results in the reference vectors better resembling the speaker's voice.

An alternate embodiment of the present invention eliminates any inaccuracies in the matching procedure by insuring it correctly identified the utterance before adapting the reference vectors to the utterance to minimize false or incorrect adaptations. In this alternate embodiment, the present invention outputs the utterance, for example a sentence, in a format the user can readily interpret, such as video or audio form. The user then either acknowledges the output as being correct, or repeats the utterance. The system will not update the reference vectors its discussed above until it receives acknowledgment from the user that its interpretation is correct, i.e., the Markov Models selected by the present invention are indeed the utterance that was presented.

The updated reference vectors are stored by the present invention at step 33. These updated reference vectors are then used by the system in recognizing subsequent utterances (i.e., as discussed in step 25 of FIG. 2A). In this way, the present invention continuously updates itself to better conform to the individual speaker and the background noise.

Figure 4:
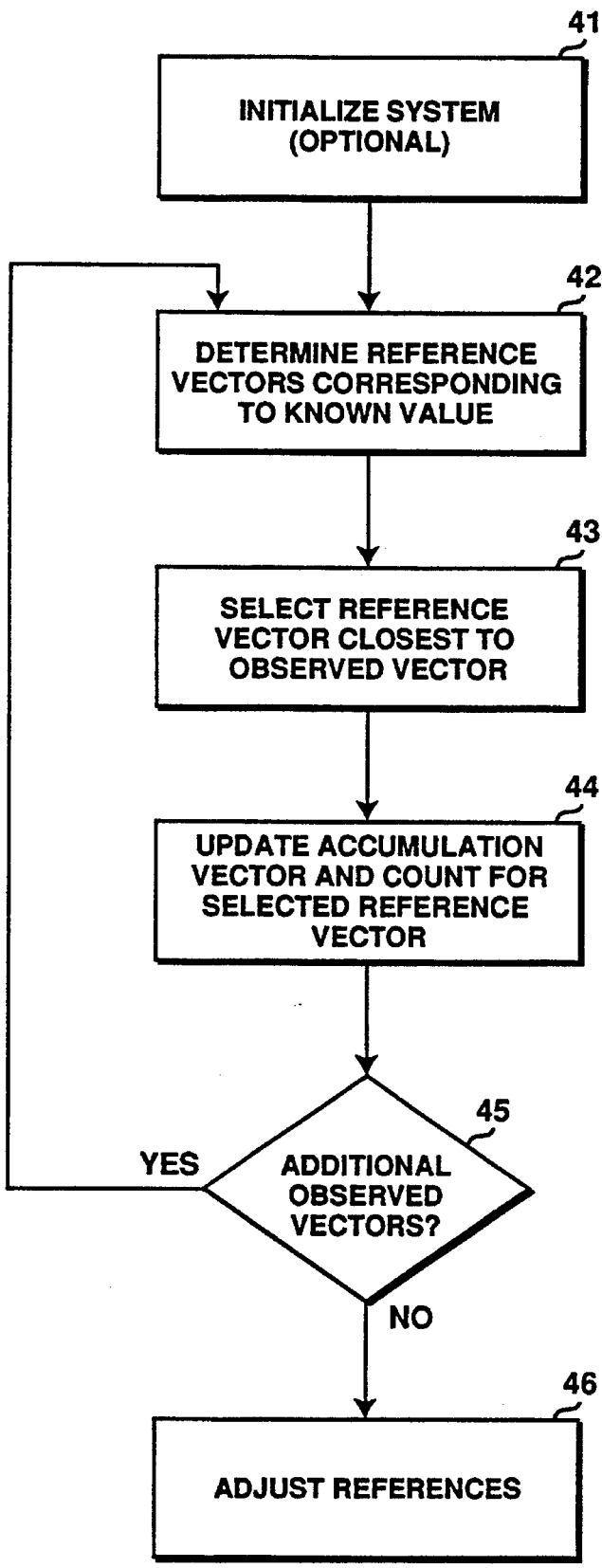
FIG. 4 is a flowchart describing the updating process used by the computer system of the present invention in detail.

FIG. 4 shows a flowchart of the updating step 32 of FIG. 3. The present invention follows this process for each observed vector in the input utterance. The present invention first initializes the computer system at step 41. After initialization, the present invention performs the following steps for each observed vector corresponding to the resultant Markov Model. First, the present invention directs the computer system to determine the reference vectors associated with a given arc of the Model at step 42. This determination will probably result in multiple reference vectors being associated with the given arc. Therefore, at step 43 the present invention selects the reference vector determined in step 42 which is closest to the observed vector corresponding to the given arc. After selecting the proper reference vector to be updated, the present invention updates an accumulation vector and a count associated with the proper reference vector, at step 44. The accumulation vector stores the observed vectors of prior utterances which were aligned with this reference vector; the count records how many prior observed vectors are stored in the accumulation vector associated with the reference vector. The present invention imposes a limit on how many prior observed vectors may be stored in an accumulation vector; the present invention uses this limit to downweight the value of older prior utterances in favor of newer prior utterances. The present invention directs the computer system to repeat these steps for each observed vector associated with the resultant Markov Model, as shown in step 45. Finally, the present invention directs the system to adjust all of the reference vectors in the system based on these updated accumulation vectors and counts at step 46.

Figure 5:
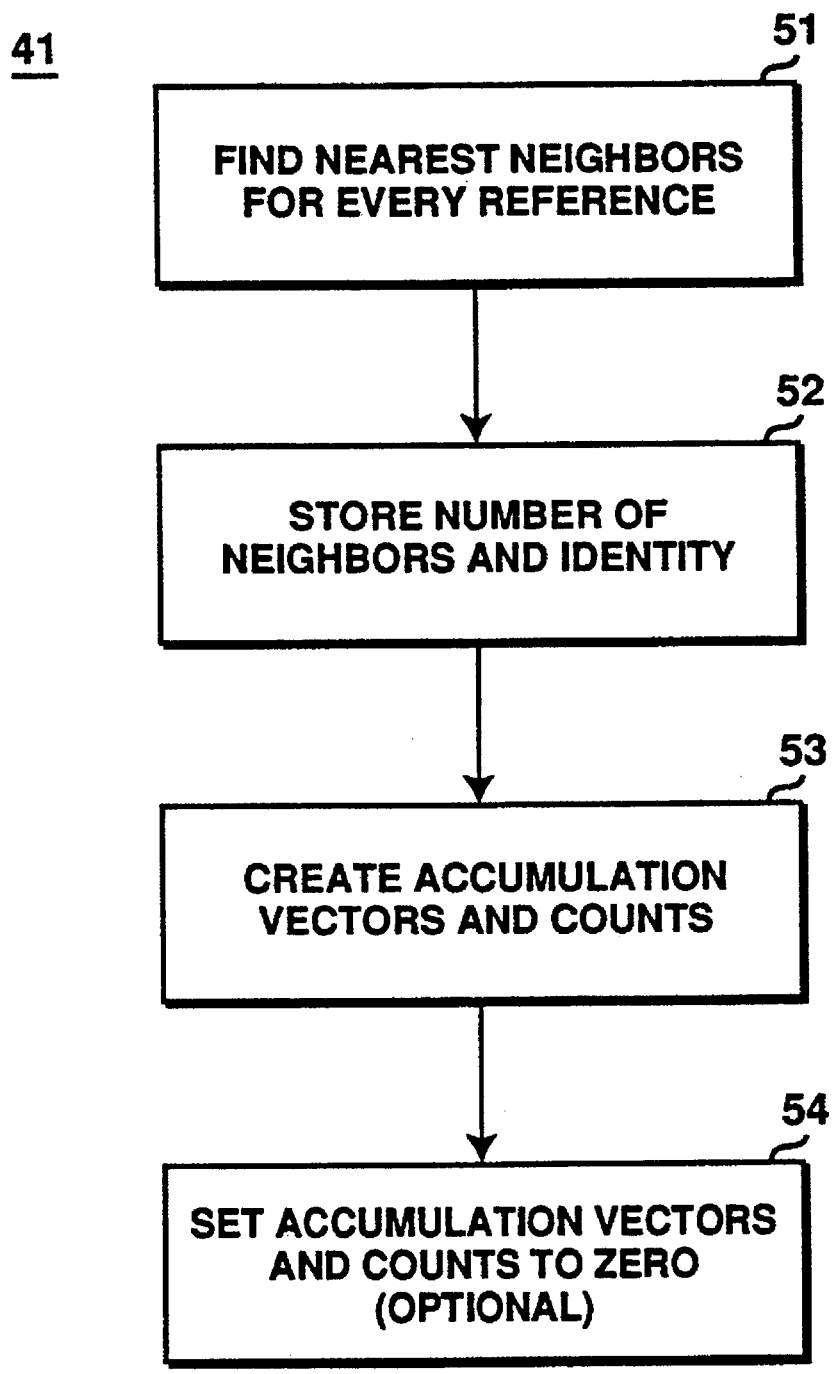
FIG. 5 is a flowchart of the method used by the computer system of the present invention in describing the initialization process of FIG. 4 in detail.

The present invention initializes the computer system at step 41. FIG. 5 shows the initialization process in more detail. The present invention determines the closest neighbors of every reference vector stored in the system's memory in step 51. These closest neighbors are determined by calculating the distance between a particular reference vector and all other reference vectors known to the computer system. This distance is typically Euclidean distance, however, any other distance measure may be used. After calculating these distances, the system will choose the n neighbor reference vectors closest to each particular reference vector. The present invention in step 52 stores the number of neighbors, n, and their identity for every reference in the memory unit 102 of the system, such as by using arrays. The value n is a predetermined value and is dependent on the total number of reference vectors N stored in the computer system. It is appreciated that a number of well known processes exist for providing reference vectors that model speech characteristics and that these well known processes may be utilized within the scope of the present invention to supply the initial set of reference vectors. Typical values for N are in the range of a few hundred to several thousand, and typical values for n range from N/200 to N/50 for the preferred embodiment of the present invention.

The present invention calculates the n closest neighbors to a particular reference vector for every reference vector stored in the system's memory. It should be noted that the nearest neighbor for any given reference vector is that reference vector itself. The importance and use of these neighbors will be explained in detail below.

In step 53 of FIG. 5 the present invention establishes an accumulation vector and a count corresponding to every reference vector in the system. These accumulation vectors will be of the same dimension as the reference vectors, i.e., they will have the same number of elements. The present invention uses these accumulation vectors to store the input data of prior utterances. That is, when a reference vector is updated, the observed vector it is aligned with will be added to its accumulation vector. The accumulation vectors are maintained by the present invention for use in analyzing and adapting to subsequent input data.

Both the accumulation vectors and the counts are stored in a memory unit 102 of the computer system using methods well known in the art, such as arrays. The newly created accumulation vectors and counts are then initialized to zero in step 54.

Step 54 is optional. At step 54, the accumulation vectors and counts are initialized for the first utterance recognized after the system is activated. However, the present invention need not re-initialize these values to zero for each new speaker. If re-initialization was desired the user would indicate the existence of a new speaker using any device for inputting information to the computer system. For example, referring to FIG. 1A, the user may physically input a command selection using the cursor control device 107, the alphanumeric input device 106, or a command selection may be input by using a voice command input through microphone 109. Alternatively the present invention may automatically recognize the existence of a new speaker based on that of a new speaker's voice and re-initialize the accumulation vectors and counts.

If re-initialization is not desired for every new speaker, the present invention will simply start adapting itself to the new speaker immediately after receiving that speaker's voice. Over time, the system will degrade the importance of the adaptations made for the previous speaker, which results in the system being able to change speakers without any reset or initialization. The method of this degradation will be explained in detail below.

Returning to FIG. 4, it should also be noted that the initialize system step 41 is optional. Resetting the accumulation vectors and counts may or may not be done when processing a new utterance, as described above. Similarly, it will be apparent to those skilled in the art that the accumulation vector and the count need only be created once. After creation, they will remain stored in the memory unit of the system until the system is deactivated or instructed to clear that section of the memory unit.

The proper reference vector to be updated must be determined next, shown in step 42. The present invention determines the proper reference vector by comparing the Markov arcs from the resultant Model above to the set of reference vectors stored in the system. It is possible that only one reference vector is associated with the arc, however it is more likely that multiple reference vectors are associated with the arc, in which case one vector from the set of associated vectors must be chosen as the proper vector.

The present invention resolves this problem in step 43. The present invention assumes that the one reference vector associated with the arc from the resultant Model that is closest to the observed vector is the proper reference vector. Therefore, by comparing the observed vector to the set of reference vectors associated with the arc from the resultant Model, the reference vector in the set which is closest to the observed vector will be selected as the proper reference vector for the observed vector.

In an alternative embodiment, the present invention does not limit itself to finding a single proper reference vector for a given observed vector. This alternate embodiment gives each reference vector associated with the arc of the resultant Model a weight according to its distance from the observed vector. The accumulation vector and count for each of the reference vectors is then updated in proportion to this weight. This alternate system results in every reference vector associated with the arc being updated, with reference vectors closest to the observed vector being affected the most while reference vectors furthest from the observed vector are affected the least.

Figure 6:
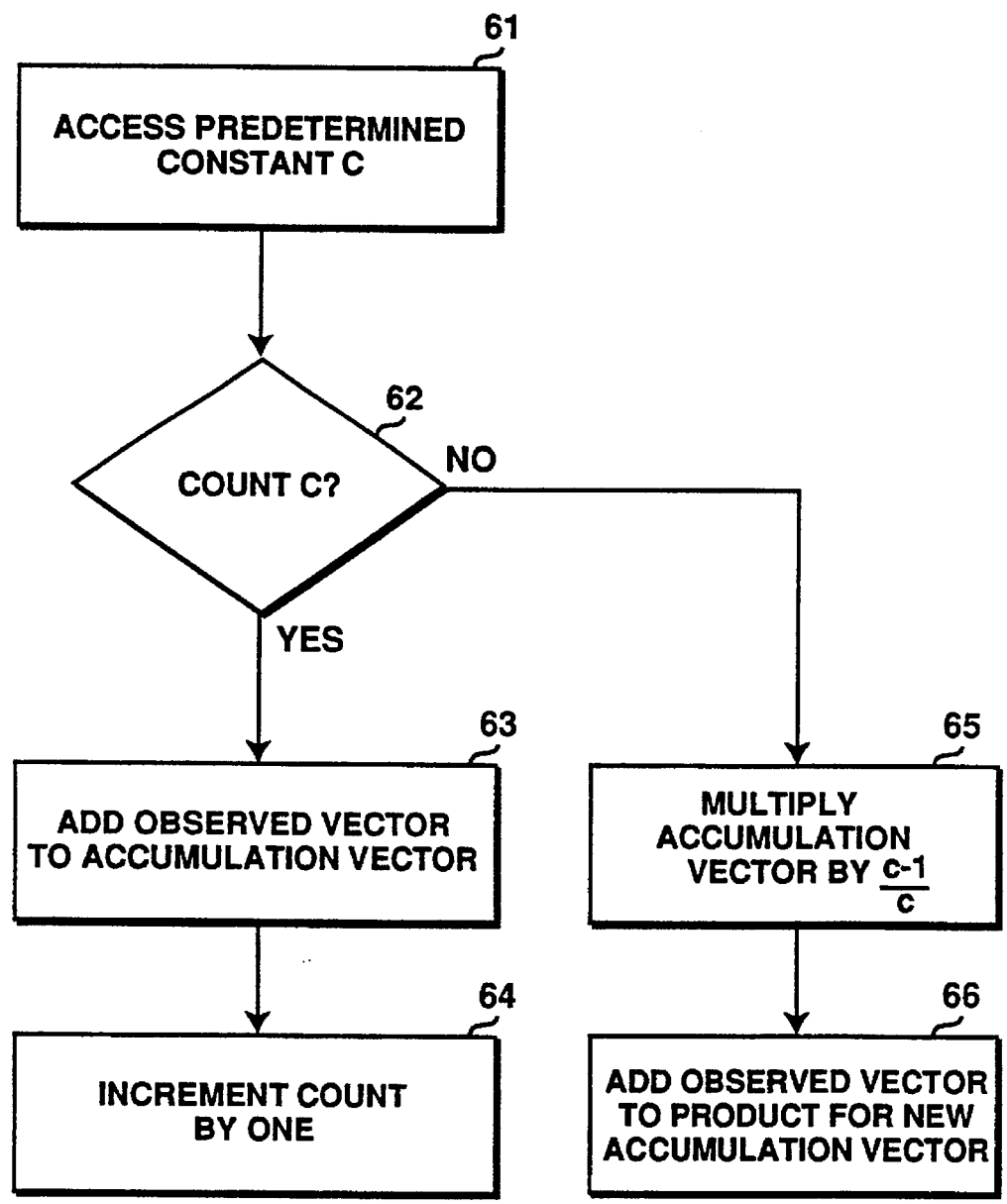
FIG. 6 is a flowchart of the method used by the computer system of the present invention in updating the accumulation vector and count for a given reference vector.

In step 44, the preferred embodiment of the present invention updates the accumulation vector and the count for the reference vector selected in step 43. The method for updating each is shown in FIG. 6. First, in step 61, the present invention directs the computer system to access a predetermined constant C stored in a memory unit of the computer system. The value of C determines the decay rate of the influence of previous input data, i.e., utterances. That is, the value of C will determine what proportion of the updated accumulation vector will be attributable to the prior input data in the accumulation vector and what proportion will be attributable to the observed vector being added to the accumulation vector. Therefore, it can be seen that the value of C determines how quickly the system adapts to changing conditions. The values for C are variable, however reasonable values lie in the range from 15 to 50.

After accessing the value of C, the present invention compares the count corresponding to the selected reference vector to the value of C, as shown in step 62. The present invention will then follow one of two paths, determined by the outcome of this comparison. The values the system is concerned with are the constant C, the accumulation vector a corresponding to the selected reference vector, the new accumulation vector a' to be calculated to correspond to the selected reference vector, the observed vector v currently being processed by the system, the count c corresponding to the selected reference vector, and the new count c' to be calculated to correspond to the selected reference vector.

If count c is less than the constant C, then the present invention makes the following calculations, shown in steps 63 and 64:

$$a' = a + v \quad (1)$$

$$c' = c + 1 \quad (2)$$

In calculation (1), the present invention creates the new accumulation vector by summing the old accumulation vector and the observed vector; in calculation (2), the present invention increments the count for the selected reference vector by one.

If count c is greater than or equal to the constant C, then the present invention makes the following calculation, shown in steps 65 and 66:

$$a' = \frac{C-1}{C} \cdot a + v \quad (3)$$

In computation (3), the present invention creates the new accumulation vector by adding the observed vector to a fraction of the old accumulation vector. This fraction, determined by the value of C, controls the proportion of the new accumulation vector which is attributable to the observed vector. It will be readily apparent to those skilled in the art that larger values of C will result in a slower decay of the previous input data than will smaller values of C.

It should be noted that when count c is greater than or equal to the constant C, the count c is not incremented by one. This is because the fraction of C used to downweight the accumulation vector essentially reduces the amount of input data in the accumulation vector by an equivalent of one. Therefore, by adding the new observed vector to the accumulation vector, the amount of input data is essentially increased by an equivalent of one. Thus, the count retains its original value of c.

It should also be noted that in addition to determining how quickly the present invention adapts to change, the value of C also determines how many observed vectors one needs to accumulate before being able to perform meaningful downweighting of older data. That is, the accumulation vector will not be downweighted until C observed vectors have been added to it.

Returning to FIG. 4, the present invention updates the accumulation vectors and counts for each observed vector in the utterance, as shown in step 45. After updating all the appropriate accumulation vectors and counts, the present invention directs the computer system to adjust all of the reference vectors stored in the system, as shown in step 46.

It should be noted that all reference vectors are adjusted, not just those whose accumulation vectors were updated. This is because the adjustment process used, as detailed below, takes into account the acoustic neighborhood of the reference vector being adjusted. Therefore, a particular reference vector will change if the accumulation vector of a reference vector in its acoustic neighborhood was updated, even if the accumulation vector of the particular reference vector itself was not updated. The acoustic neighborhood of a particular reference vector is a subset of its n closest neighbors calculated in step 52 of FIG. 5; the calculation of the acoustic neighborhoods is discussed in detail below.

Acoustic neighborhoods are utilized by the preferred embodiment of the present invention to increase the effectiveness of the adaptation process. Effectiveness is increased because the system will better adapt to a new speaker, even though little data exists for this particular speaker. As the speaker inputs additional data to the system, i.e. utterances, the system adapts to the speaker and the size of the neighborhoods will slowly shrink.

Figure 7:
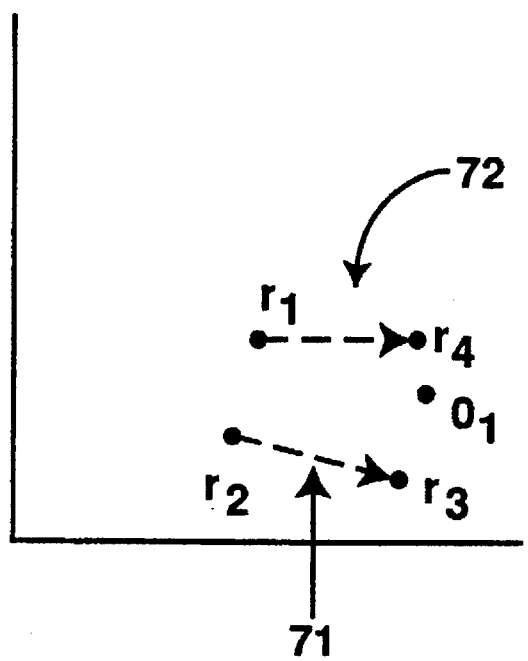
FIG. 7 is a graph depicting multiple reference vectors in a two-dimensional vector space.

An example of this increased effectiveness is shown in FIG. 7, which shows a two-dimensional space containing a set of reference vectors. Note that only two dimensions are shown for simplicity; the preferred embodiment would generally be of substantially greater dimension. Similarly, only reference vectors $r_1$ through $r_4$ are shown, however the preferred embodiment of the present invention would consist of hundreds or thousands of vectors. The reference vectors $r_1$ through $r_4$ represent two very similar sounds, for example "m" and "n." Let $r_1$ represent the "m" vector and $r_2$ represent the "n" vector. Next, assume that an utterance is recognized and accurately identified by the present invention containing, an "n", vector $r_2$. If the system did not utilize acoustic neighborhoods, $r_2$ would be adjusted to be closer to the observed vector for "n", and would be updated to be $r_3$, shown by dashed arrow 71. Now, assume that the next utterance contains an "m", and the observed vector for the "m" is $o_1$. This vector $o_1$ should correspond to $r_1$, the correct reference vector for "m", however it is clear that vector $o_1$ is closer to reference vector $r_3$, and would therefore be incorrectly identified as being a "n." Therefore, the present invention adapts the reference vectors for both "n" and "m" to perform a proper adaptation.

The present invention solves this problem by utilizing the acoustic neighborhoods. If $r_1$ and $r_2$ were in the same acoustic neighborhood, then $r_1$ would have been updated to $r_4$ its shown by arrow 72 when $r_2$ was updated to $r_3$. Therefore, when observed vector $o_1$ was compared to the reference vectors, the system would have associated it with r₄ and correctly identified it as a "m."

Figure 8:
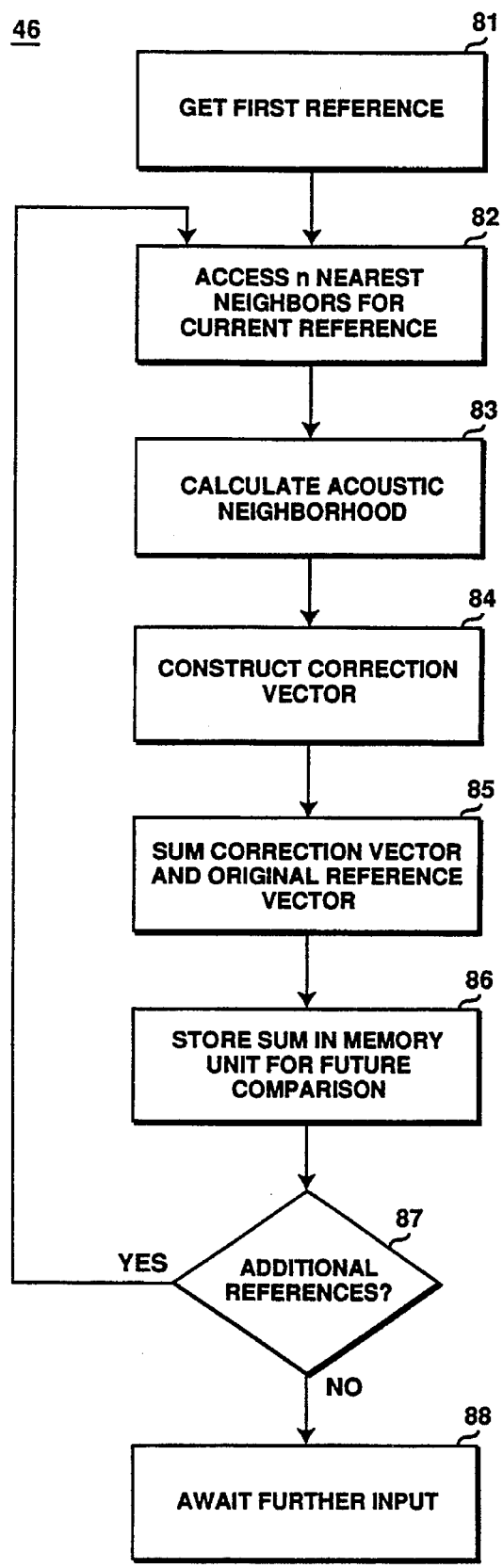
FIG. 8 is a flowchart of the method used by the computer system of the present invention in adjusting reference vectors.

The process used by the present invention to correct each reference vector, step 46 of FIG. 4, is shown in detail in FIG. 8. The present invention begins by selecting a reference vector from the stored set of reference vectors, step 81. The present invention then directs the computer system to access the n nearest neighbors to the selected reference vector as stored at step 52 in FIG. 5, shown in step 82. The present invention then calculates the number of these n neighbors to be used in determining the proper correction for the selected reference vector, step 83. The number of neighbors used is referred to as the acoustic neighborhood of the selected reference vector.

The acoustic neighborhood will shrink as the system adapts to the speaker. This decrease is due to the fact that very little input data exists for an individual speaker when the speaker starts using the system. Therefore, the present invention utilizes input data from multiple reference vectors because insufficient input data exists in the accumulation vector of the reference vector to be corrected to rely on that reference vector's data alone. The present invention assumes that input data acquired from acoustically similar utterances is more reliable than relying on a small amount of input data from the reference vector to be corrected. However, over time the accumulation vector for the reference vector will grow to contain sufficient data to adapt the reference itself. At this point the acoustic neighborhood of a reference vector becomes that reference vector itself.

Figure 9:
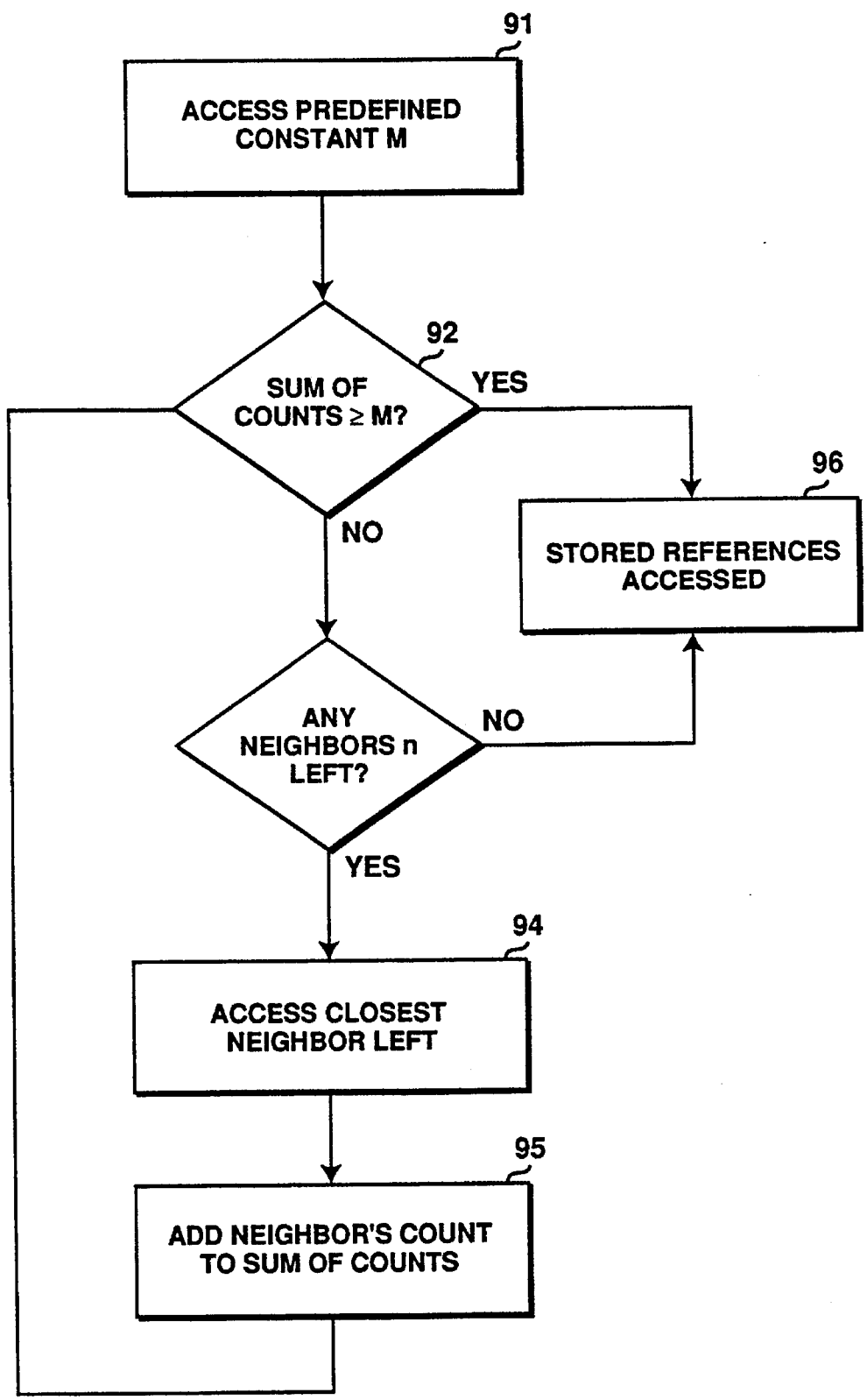
FIG. 9 is a flowchart of the method used by the computer system of the present invention in calculating an acoustic neighborhood.

The process used to calculate the acoustic neighborhood is shown in FIG. 9. The present invention first directs the computer system to access the value of a predefined constant M at step 91. The value of M represents the amount of prior input data desired on which to base the correction. That is, the present invention prefers to correct a particular reference vector after having received as input data at least M observed vectors aligned with the particular reference vector (or an acoustic neighbor). Reasonable values for M lie in the range from 15 to 25.

After accessing M, the count of the reference vector selected in step 82 of FIG. 8 is compared to the value of M, shown in step 92. If the value of the selected reference vector's count equals or exceeds M, then the present invention directs the computer system to store the selected reference vector, step 96, and the present invention proceeds to step 84 of FIG. 8. In this case, the present invention assumes that sufficient input data has been accumulated in the selected reference vector's accumulation vector to accurately calculate a correction vector based on that data alone.

However, if the selected reference vector's count does not equal or exceed M, then the present invention will attempt to retrieve input data from the selected reference vector's acoustic neighbors, as stored in their accumulation vectors. First, the present invention will check if any neighbors remain whose data hasn't already been included, step 93. If no neighbors remain, then the present invention proceeds to step 96, directing the computer system to store the selected reference vector and any other reference vectors in the neighborhood that were included here, and proceeds to construct the correction vector, step 84 of FIG. 8. The present involution works on the assumption that if no neighbors remain then it is better to adjust the selected reference vector based on what input data is available rather than factor in input data which is beyond the reference vector's neighborhood. That is, it is better to proceed with too little data than to factor in data which is not acoustically similar to the selected reference vector.

If, however, any neighbors do exist, the present invention factors them in. The present invention accesses the closest neighbor to the selected reference vector remaining in the neighborhood at step 94. The present invention adds that neighbor's count to the sum of the counts of the selected reference vector and any other reference vectors accessed. The present invention then repeats the process by comparing the new sum of the counts to M in step 92. The present invention continues this process until no neighbors remain or the sum of the counts exceeds M.

It should be realized that the value of M represents a tradeoff between how quickly adaptation begins to have an effect and how accurate the correction vectors are. That is, lower values of M require a smaller acoustic neighborhood and require less accumulated data to make a correction vector. Therefore, each observed vector constituting data in the accumulation vector will contribute a higher proportion to the correction vector, thereby making correction more rapid. Additionally, because the correction is based on a smaller amount of data, the correction vectors will be less accurate than they would be with a higher value of M.

Returning to FIG. 8, the present invention constructs the correction vector at step 84 after the acoustic neighborhood is calculated. The system calculates the correction vector according to the following procedure:

$$r' = \frac{\sum_{i=1}^{m} a(i) - c(i)r(i)}{\max\left(\sum_{i=1}^{m} c(i), M\right)} \quad (4)$$

The variables in procedure (4) are as follows: m represents the number of reference vectors in the selected reference vector's acoustic neighborhood as calculated in step 83, a represents the accumulation vectors corresponding to the m reference vectors in the acoustic neighborhood, c represents the count corresponding to the m reference vectors in the acoustic neighborhood, r represents the m reference vectors in the acoustic neighborhood, and M is the predefined constant M accessed in step 93 of FIG. 9.

The present invention uses procedure (4) for each reference vector in the acoustic neighborhood of the selected reference vector. In procedure (4), the present invention multiplies the reference vector by its corresponding count and subtracts the product from its corresponding accumulation vector. This difference represents the amount the reference vector should be moved to more closely match its associated observed vectors. After summing this difference for each reference vector in the acoustic neighborhood, the present invention divides the result by the greater of either the sum of the counts of the reference vectors in the acoustic neighborhood or the value of the constant M. This is done to give correction vectors calculated from less than the desired amount of data a lesser weight in correcting the reference vector, thereby making the present invention's adaptation more accurate.

After constructing the correction vector, the present invention sums the correction vector and the original reference vector in step 85, as shown in the following computation:

$$r'' = r' + r \quad (5)$$

The variables in computation (5) are as follows: r" represents the newly updated reference vector, r' represents the correction vector from computation (4), and r represents the original reference vector stored in the system.

Next, in step 86, the present invention directs the computer system to store the sum calculated in step 85 in a memory unit 102 as a corrected reference vector. The present invention then checks whether all reference vectors stored in the computer system have been corrected, as shown in step 87. If uncorrected reference vectors remain, the present invention corrects them, returning to step 82 and repeating the above process.

It should be noted that a corrected reference vector will not necessarily be different from the original reference vector. Given the large number of reference vectors contained in the system, it is likely that some of them will be unaffected by accumulation vectors updated as a result of a particular utterance. This is likely even when utilizing the acoustic neighborhoods of the present invention.

The present invention uses the corrected reference vectors in recognizing subsequent utterances. The present invention repeats the above process for each utterance input to the system. It should be noted that the present invention retains the original reference vectors in a storage unit. Every utterance processed by the present invention generates a new set of correction vectors which are added to the original reference vectors, not the previous set of corrected reference vectors. The adjustments based on previous utterances are retained in the accumulation vectors, thereby giving the present invention the ability to factor in previous utterances when calculating new correction vectors, as described above.

An alternate embodiment of the present invention does not utilize the acoustic neighborhoods or accumulation vectors of the preferred embodiment. In this alternate embodiment the reference vectors are updated according to the following calculation:

$$r' = (1-a)r + a\,v$$

where r' represents the new reference vector, a represents a constant, r represents the current reference vector, and v represents the current observed vector. Typical values of a range from 0.05 to 0.10. It will be seen that this embodiment creates a new reference vector based on the current reference vector and the current observed vector alone; no acoustic neighborhoods are involved.

In this alternate embodiment, if subsequent observed vectors in the utterance are aligned with this same reference vector, then the new reference vector for that observed vector is calculated using this new reference vector as the current reference vector, as shown in the following computation:

$$r'' = (1-a)r' + a\,v$$

where r'' represents the new reference vector for the subsequent observed vector. It will be seen that this alternate embodiment involves less data manipulation than the preferred embodiment, and therefore has a slightly increased speed. These benefits, however, are at the cost of the advantages of the acoustic neighborhoods and accumulation vectors as described above.

It would also be apparent to one of skill in the art from the present invention described above to store the set of updated reference vectors in a storage unit when a speaker is finished using the system. Mechanisms for storing the vectors and later retrieving them would include any device for inputting information to the computer system. For example, referring to FIG. 1A, the user may physically input a command selection using the cursor control device 107, the alphanumeric input device 106, or a command selection may be input by using a voice command input through microphone 109. This storage and retrieval of reference vectors would permit the system to adapt to a given speaker's voice, accept input from and adapt to subsequent speakers, and then return to the adapted system for that given speaker upon that speaker's return.

The preferred embodiment of the present invention, an apparatus and method for continuously updating references of a pattern recognition system to adapt to the input signal, is thus described. While the present invention has been described in particular embodiments, it should be appreciated that the present invention should not be construed as limited by such embodiments, but rather construed according to the below claims.

What is claimed is:

1. An apparatus for pattern recognition of data input comprising:

means for representing said data input as a set of observed vectors, wherein individual observed vectors of said set of observed vectors represent said data input at a different point in time;

means for comparing a first subset of said set of observed vectors to a set of models by comparing a set of reference vectors associated with said set of models to said set of observed vectors and identifying a resultant model which most closely matches said first subset, wherein said resultant model is one of said set of models;

means for creating a set of accumulation vectors wherein individual accumulation vectors of said set of accumulation vectors correspond to individual reference vectors of said set of reference vectors, and wherein a first accumulation vector of said set of accumulation vectors stores a first observed vector, and wherein said first observed vector was previously associated with a first reference vector of said set of reference vectors;

means for updating said set of reference vectors to create an updated set of reference vectors associated with said set of models to more accurately represent said data input, wherein said means for updating combines said first accumulation vector with said first reference vector; and means for utilizing said updated set of reference vectors in comparing subsequent data input streams to said set of models.

2. An apparatus for pattern recognition as claimed in claim 1 wherein said set of models consists of a set of Markov Models.

3. An apparatus for pattern recognition as claimed in claim 1 wherein said means for updating further comprises:

means for creating a set of counters such that individual counters of said set of counters correspond to individual reference vectors of said set of reference vectors;

means for comparing each observed vector of said first subset of said set of observed vectors to said set of reference vectors;

means for determining a closest reference vector to each of said observed vectors wherein said closest reference vector is more similar to said observed vector than any other reference vector in said set of reference vectors;

means for incrementing an individual counter corresponding to said closest reference vector, said individual counter indicating the number of observed vectors which have been added to the accumulation vector corresponding to said closest reference vector; and means for adding said observed vector to the accumulation vector corresponding to said closest reference vector.

4. An apparatus for pattern recognition as claimed in claim 3 wherein said means for updating further comprises:

means for determining a subset of said set of reference vectors such that said subset of reference vectors is closer to said closest reference vector than other reference vectors of said set of reference vectors which are not within said subset;

means for determining the number of said reference vectors in said subset;

means for constructing a correction vector based on said number of said reference vectors in said subset and said accumulation vectors corresponding to said reference vectors in said subset; and means for summing said correction vector and said closest reference vector.

5. An apparatus for pattern recognition as claimed in claim 3 wherein said means for adding said observed vector to said accumulation vector further comprises means for assigning said observed vector a larger proportion of the sum than prior additions of observed vectors to said accumulation vector.

6. An apparatus for pattern recognition as claimed in claim 1 wherein said means for updating further comprises:

means for creating a set of counters such that individual counters of said set of counters correspond to individual reference vectors of said set of reference vectors;

means for comparing each observed vector of said first subset of said set of observed vectors to said set of reference vectors;

means for determining a first subset of said set of reference vectors which are more similar to said observed vector than other reference vectors in said set of reference vectors;

means for incrementing the individual counters corresponding to the individual reference vectors of said subset of said set of reference vectors, each of said individual counters indicating the number of observed vectors which have been added to the accumulation vector of the corresponding reference vector;

means for multiplying said observed vector by a fraction to generate a portion of said observed vector, wherein said fraction is determined by a similarity between said observed vector and an individual reference vector in said subset; and means for summing said portion of said observed vector to individual reference vectors in said first subset.

7. An apparatus for pattern recognition as claimed in claim 6 wherein said means for updating further comprises:

means for determining a particular reference vector in said first subset of said set of reference vectors;

means for determining a second subset of said set of reference vectors such that said second subset of reference vectors is closer to said particular reference vector than other reference vectors of said set of reference vectors which are not within said second subset;

means for determining the number of said reference vectors in said second subset;

means for constructing a correction vector based on said number of said reference vectors in said second subset and said accumulation vectors corresponding to reference vectors in said second subset; and means for summing said correction vector and said particular reference vector.

8. An apparatus for pattern recognition as claimed in claim 6 wherein said means for summing said portion further comprises means for assigning said portion of said observed vector a larger proportion of the sum than prior additions of portions of observed vectors to said accumulation vector.

9. An apparatus for pattern recognition as claimed in claim 1 wherein each vector of said set of reference vectors consists of a Gaussian distribution.

10. An apparatus for pattern recognition as claimed in claim 1 further comprising:

means for long-term storage of said updated reference vectors;

means for associating said updated reference vectors with a particular input source; and means for recovering said updated reference vectors from said means for long-term storage.

11. An apparatus for pattern recognition as claimed in claim 1 further comprising:

means for requesting user-acknowledgment of said resultant model;

means for receiving said user-acknowledgment as input to the system; and means for receiving a repeated data input.

12. An apparatus for pattern recognition as claimed in claim 1 wherein said data input comprises speech input.

13. A computerized method for pattern recognition of data input, wherein said data input represents one or more unknown patterns, said method comprising the computer-implemented steps of:

a) transforming said data input into a set of observed vectors, wherein individual observed vectors of said set of observed vectors represent said data input at a different point in time;

b) comparing a first subset of said set of observed vectors to a set of models utilizing a set of reference vectors associated with said set of models and identifying a resultant model which most closely matches said first subset, wherein said resultant model is one of said set of models;

c) creating a set of accumulation vectors wherein individual accumulation vectors of said set of accumulation vectors correspond to individual reference vectors of said set of reference vectors, and wherein a first accumulation vector of said set of accumulation vectors stores a first observed vector, and wherein said first observed vector was previously associated with a first reference vector of said set of reference vectors;

d) updating said set of reference vectors to create a set of updated reference vectors associated with said set of models to more accurately represent said data input, wherein said updating includes combining said first accumulation vector with said first reference vector; and e) utilizing said set of updated reference vectors in comparing subsequent data input streams to said set of models.

14. A method for pattern recognition as claimed in claim 13 wherein said set of models consists of a set of Markov Models.

15. A method for pattern recognition as claimed in claim 13 wherein said step c) further comprises:

creating a set of counters such that individual counters of said set of counters correspond to individual reference vectors of said set of reference vectors;

comparing each of said observed vectors to said set of reference vectors;

determining a closest reference vector to each of said observed vectors wherein said closest reference vector is more similar to said observed vector than any other reference vector in said set of reference vectors;

incrementing an individual counter corresponding to said closest reference vector, said individual counter indicating the number of observed vectors which have been added to the accumulation vector corresponding to said closest reference vector; and adding said observed vector to the accumulation vector corresponding to said closest reference vector.

16. A method for pattern recognition as claimed in claim 15 wherein said step c) further comprises:

determining a subset of said set of reference vectors such that said subset of reference vectors is closer to said closest reference vector than other reference vectors of said set of reference vectors which are not within said subset;

determining the number of said reference vectors in said subset;

constructing a correction vector based on said number of said reference vectors in said subset and said accumulation vectors corresponding to said reference vectors in said subset; and summing said correction vector and said closest reference vector.

17. A method for pattern recognition as claimed in claim 15 wherein said step of adding further comprises the step of assigning said observed vector a larger proportion of the sum than prior additions of observed vectors to said accumulation vector.

18. A method for pattern recognition as claimed in claim 13 wherein said step c) further comprises:

creating a set of counters such that individual counters correspond to individual reference vectors in said set of reference vectors;

comparing each of said observed vectors to said set of reference vectors;

determining a first subset of said set of reference vectors which are more similar to said observed vector than other reference vectors in said set of reference vectors;

incrementing the individual counters corresponding to the individual reference vectors of said subset of said set of reference vectors, each of said individual counters indicating the number of observed vectors which have been added to the accumulation vector of the corresponding reference vector;

multiplying said observed vector by a fraction to generate a portion of said observed vector, wherein said fraction is determined by a similarity between said observed vector and an individual reference vector in said subset; and summing said portion of said observed vector to individual reference vectors in said first subset wherein said portion of said observed vector is determined by a similarity between said observed vector and an individual reference vector in said subset.

19. A method for pattern recognition as claimed in claim 18 wherein said step c) further comprises:

determining a particular reference vector in said first subset of said set of reference vectors;

determining a second subset of said set of reference vectors such that said second subset of reference vectors is closer to said particular reference vector than other reference vectors of said set of reference vectors which are not within said second subset;

determining the number of said reference vectors in said second subset; constructing a correction vector based on said number of said reference vectors in said second subset and said accumulation vectors corresponding to said reference vectors in said second subset; and summing said correction vector and said particular reference vector.

20. A method for pattern recognition as claimed in claim 18 wherein said step of summing said portion further comprises assigning said portion of said observed vector a larger proportion of the sum than prior additions of portions of observed vectors to said accumulation vector.

21. A method for pattern recognition as claimed in claim 13 wherein each vector of said set of reference vectors consists of a Gaussian distribution.

22. A method for pattern recognition as claimed in claim 13 further comprising:

storing said updated reference vectors in a storage means;

associating said updated reference vectors with a particular input source; and recovering said updated reference vectors from said storage means.

23. A method for pattern recognition as claimed in claim 13 further comprising the steps of:

requesting user-acknowledgment of said resultant model;

receiving said user-acknowledgment; and receiving a repeated data input.

24. A method for pattern recognition as claimed in claim 13 wherein said data input comprises speech input.

25. In a computer system, an apparatus for speech recognition of data input utilizing Markov Models comprising:

an input device;

a memory unit, said memory unit storing a set of Markov Models and a set of reference vectors associated with said set of Markov Models;

a digital processor, said digital processor being coupled to said input device and said memory unit, said digital processor converting said data input to a set of observed vectors wherein individual observed vectors represent said data input at a different point in time, said digital processor comparing a first subset of said set of observed vectors to said set of Markov Models utilizing said set of reference vectors and identifying a resultant Markov Model of said set of Markov Models which most closely resembles said data input, said digital processor comparing said set of observed vectors to said set of reference vectors associated with said resultant Markov Model, said digital processor creating a set of accumulation vectors wherein individual accumulation vectors of said set of accumulation vectors respond to individual reference vectors of said set of reference vectors, and wherein a first accumulation vector of said set of accumulation vectors stores a first observed vector, and wherein said first observed vector was previously associated with a first reference vector of said set of reference vectors, said digital processor updating said set of reference vectors to create an updated set of reference vectors associated with said set of Markov Models to more accurately represent said observed vectors by combining said first accumulation vector with the first reference vector, said memory unit storing said updated set of reference vectors, and said digital processor utilizing said updated set of reference vectors in comparing subsequent input data to said set of Markov Models.

26. An apparatus for speech recognition as claimed in claim 25 wherein each vector of said set of reference vectors consists of a Gaussian distribution.

27. An apparatus for speech recognition as claimed in claim 25 further comprising:
a storage unit coupled to said input device, said memory unit and said digital processor.

28. An apparatus for speech recognition is claimed in claim 27 further comprising said digital processor associating said updated reference vectors with a particular input source, said digital processor storing said updated reference vectors in said storage unit, and said digital processor recovering said updated reference vectors from said storage unit.

29. An apparatus for speech recognition as claimed in claim 25 further comprising:
an output unit coupled to said digital processor, and
a command input unit coupled to said digital processor.

30. In a computer system, an apparatus for speech recognition of data input utilizing Markov Models comprising:
an input device;
a memory unit, said memory unit storing a set of Markov Models and a set of reference vectors associated with said set of Markov Models;
a digital processor, said digital processor being coupled to said input device and said memory unit, said digital processor converting said data input to a set of observed vectors wherein individual observed vectors represent said data input at a different point in time, said digital processor comparing a first subset of said set of observed vectors to said set of Markov Models utilizing said set of reference vectors and identifying a resultant Markov Model of said set of Markov Models which most closely resembles said data input, said digital processor comparing said set of observed vectors to said set of reference vectors associated with said resultant Markov Model, said digital processor updating said set of reference vectors to create an updated set of reference vectors associated with said set of Markov Models to more accurately represent said set of observed vectors by combining a first observed vector or said first subset of said set of observed vectors with a first reference vector of said set of reference vectors, said memory unit storing said updated set of reference vectors, said digital processor utilizing said updated set of reference vectors in comparing subsequent input data to said set of Markov Models, said digital processor creating a set of accumulation vectors wherein individual accumulation vectors correspond to individual reference vectors in said set of reference vectors, said memory unit storing said set of accumulation vectors, said digital processor creating a set of counters wherein individual counters of said set of counters correspond to individual reference vectors of said set of reference vectors, each of said individual counters indicating the number of observed vectors which have been added to the accumulation vector of the corresponding reference vector, said memory unit storing said set of counters, said digital processor comparing each of said first subset of observed vectors to said set of reference vectors, said digital processor determining a closest reference vector to each of said first subset of observed vectors wherein said closest reference vector is more similar to said observed vector than any other reference vector in said set of reference vectors, said digital processor incrementing the counter corresponding to said closest reference vector, and said digital processor adding said observed vector to the accumulation vector corresponding to said closest reference vector.

31. An apparatus for speech recognition as claimed in claim 30 further comprising said digital processor determining a subset of said set of reference vectors such that said subset of reference vectors is closer to said closest reference vector than other reference vectors of said set of reference vectors which are not within said subset, said digital processor determining the number of said reference vectors in said subset, said digital processor constructing a correction vector based on said number of said reference vectors in said subset and said accumulation vectors corresponding to said reference vectors in said subset, and said digital processor summing said correction vector and said closest reference vector.

32. An apparatus for speech recognition as claimed in claim 30 wherein said digital processor adding said observed vector to said accumulation vector assigns said observed vector a larger proportion of the sum than prior additions of observed vectors to said accumulation vector.

33. A computer system for pattern recognition of data input utilizing Markov Models comprising:
a bus;
a memory unit coupled to said bus;
a storage unit coupled to said bus which contains a set of models and a set of reference vectors associated with said set of models;
a data input unit coupled to said bus which receives said data input;
a signal processor which represents said data input as a set of observed vectors, wherein individual observed vectors of said set of observed vectors represent said data input at a different point in time; and
a central processing unit (CPU) coupled to said bus which compares a first subset of said set of observed vectors to said set of models utilizing said set of reference vectors and identifies a resultant model which most closely matches said first subset, said resultant model being one of said set of models, wherein said CPU further creates an updated set of reference vectors associated with said set of models to more accurately represent said data input by combining a first observed vector of said first subset of said set of observed vectors with a first reference vector of said set of reference vectors, and utilizes said updated set of reference vectors in comparing subsequent data input streams to said set of models, and wherein said CPU includes,
means for creating a set of accumulation vectors wherein individual accumulation vectors of said set of accumulation vectors correspond to individual reference vectors of said set of reference vectors,
means for creating a set of counters such that individual counters of said set of counters correspond to individual reference vectors of said set of reference vectors,
means for comparing each of said first subset of observed vectors to said set of reference vectors,
means for determining a closest reference vector to each of said first subset of observed vectors wherein said closest reference vector is more similar to said observed vector than any other reference vector in said set of reference vectors, means for incrementing an individual counter corresponding to said closest reference vector, said individual counter indicating the number of observed vectors which have been added to the accumulation vector corresponding to said closest reference vector, and means for adding said observed vector to an accumulation vector corresponding to said closest reference vector.

34. A computer system as claimed in claim 33 wherein said CPU further comprises:

means for determining a subset of said set of reference vectors such that said subset of reference vectors is closer to said closest reference vector than other reference vectors of said set of reference vectors which are not within said subset;

means for determining the number of said reference vectors in said subset;

means for constructing a correction vector based on said number of said reference vectors in said subset and said accumulation vectors corresponding to said reference vectors in said subset; and means for summing said correction vector and said closest reference vector.

35. A computer system as claimed in claim 33 wherein said means for adding said observed vector to said accumulation vector further comprises means for assigning said observed vector a larger proportion of the sum than prior additions of observed vectors to said accumulation vector.

36. A computer system for pattern recognition of data input utilizing Markov Models comprising:

a bus;

a memory unit coupled to said bus;

a storage unit coupled to said bus which contains a set of models and a set of reference vectors associated with said set of models;

a data input unit coupled to said bus which receives said data input;

a signal processor which represents said data input as a set of observed vectors, wherein individual observed vectors of said set of observed vectors represent said data input at a different point in time; and a central processing unit (CPU) coupled to said bus which compares a first subset of said set of observed vectors to said set of models utilizing said set of reference vectors and identifies a resultant model which most closely matches said first subset, said resultant model being one of said set of models, wherein said CPU further creates a set of accumulation vectors wherein individual accumulation vectors of said set of accumulation vectors correspond to individual reference vectors of said set of reference vectors, wherein a first accumulation vector of said set of accumulation vectors stores a first observed vector, and wherein said first observed vector was previously associated with a first reference vector of said set of reference vectors, and wherein said CPU further creates an updated set of reference vectors associated with said set of models to more accurately represent said data input by combining said first accumulation vector with said first reference vector, and utilizes said updated set of reference vectors in comparing subsequent data input streams to said set of models.

37. A computer system as claimed in claim 36 wherein said set of models consists of a set of Markov Models.

38. A computer system as claimed in claim 36 wherein each vector of said set of reference vectors consists of a Gaussian distribution.

39. A computer system as claimed in claim 36, wherein:

said storage unit also provides long-term storage of said updated reference vectors; and said CPU also associates said updated reference vectors with a particular input source, and recovers said updated reference vectors from said storage unit.

40. A computer system as claimed in claim 36 further comprising:

means for requesting user-acknowledgment of said resultant model;

means for receiving said user-acknowledgment as input to the system; and means for receiving a repeated data input.

41. A computer system as claimed in claim 36 wherein said data input comprises an audio input.

* * * * *

UNITED STATES PATENT AND TRADEMARK OFFICE
CERTIFICATE OF CORRECTION

PATENT NO : 5,617,486

DATED : April 1, 1997

INVENTOR(S) : Yen-Lu Chow

It is certified that error appears in the above-identified patent and that said Letters Patent is hereby corrected as shown below:

In the Claims:

Claim 19, line 11, (column 20, line 5) insert a new paragraph marker after the semicolon and before the text "constructing a correction vector based".

Claim 25, line 22, (column 20, line 56), delete "respond to" and insert therefor - -correspond to- -.

Claim 30, line 24, (column 21, line 47), delete "or said first subset" and insert therefor - -of said first subset- -.

Signed and Sealed this

Twenty-third Day of March, 1999

Attest:

Q. TODD DICKINSON

*Attesting Officer*       *Acting Commissioner of Patents and Trademarks*